US 8,082,583 B1

(12) United States Patent
Kodukula et al.

(10) Patent No.: US 8,082,583 B1
(45) Date of Patent: Dec. 20, 2011

(54) DELEGATION OF CONTENT FILTERING SERVICES BETWEEN A GATEWAY AND TRUSTED CLIENTS IN A COMPUTER NETWORK

(75) Inventors: Narasimham Kodukula, Sunnyvale, CA (US); Bharath Kumar Chandra Sekhar, Santa Clara, CA (US)

(73) Assignee: Trend Micro Incorporated, Tokyo (JP)

( * ) Notice: Subject to any disclaimer, the term of this patent is extended or adjusted under 35 U.S.C. 154(b) by 1197 days.

(21) Appl. No.: 11/825,935

(22) Filed: Jul. 9, 2007

(51) Int. Cl.
*G06F 11/00* (2006.01)
(52) U.S. Cl. .......................................... 726/22; 713/189
(58) Field of Classification Search ............... 726/22, 726/23, 24
See application file for complete search history.

(56) References Cited

U.S. PATENT DOCUMENTS

| | | | |
|---|---|---|---|
| 6,609,196 B1 * | 8/2003 | Dickinson et al. ............ 713/154 |
| 7,162,466 B2 | 1/2007 | Kaasten et al. | |
| 7,162,509 B2 | 1/2007 | Brown et al. | |
| 7,162,537 B1 | 1/2007 | Kathail | |
| 7,165,174 B1 | 1/2007 | Ginter et al. | |
| 7,171,379 B2 | 1/2007 | Menninger et al. | |
| 7,184,524 B2 | 2/2007 | Digate et al. | |
| 7,197,502 B2 | 3/2007 | Feinsmith | |
| 7,200,530 B2 | 4/2007 | Brown et al. | |
| 7,216,179 B2 | 5/2007 | Ott et al. | |
| 7,222,150 B1 | 5/2007 | Phillips et al. | |
| 2002/0069356 A1 * | 6/2002 | Kim .............................. 713/160 |
| 2002/0116639 A1 * | 8/2002 | Chefalas et al. ............... 713/201 |
| 2002/0143850 A1 * | 10/2002 | Caronni et al. ............... 709/201 |
| 2005/0283837 A1 * | 12/2005 | Olivier et al. ................... 726/24 |
| 2006/0150244 A1 * | 7/2006 | Klein et al. ..................... 726/12 |

* cited by examiner

*Primary Examiner* — Kim Vu
*Assistant Examiner* — Yogesh Paliwal
(74) *Attorney, Agent, or Firm* — Okamoto & Benedicto LLP

(57) ABSTRACT

Method and system for performing content filtering services in a computer network. A gateway computer may be configured to be in the data path of network communications between client computers in a private computer network and computers in a public computer network. A master entity in the gateway computer may be configured to determine content filtering services available in the client computers. The master entity may delegate to the client computers performance of content filtering services that may be reliably performed in the client computers. Each of the client computers may include a trusted agent in communication with the master entity to coordinate content filtering in the private computer network.

12 Claims, 3 Drawing Sheets

DELEGATION OF CONTENT FILTERING SERVICES BETWEEN A GATEWAY AND TRUSTED CLIENTS IN A COMPUTER NETWORK

BACKGROUND OF THE INVENTION

1. Field of the Invention

The present invention relates generally to computer security, and more particularly but not exclusively to methods and apparatus for content filtering.

2. Description of the Background Art

A computer network may employ various content filtering services to protect the network from malicious codes and other computer security threats. Content filtering services may be performed in a gateway computer of a private computer network. The gateway computer serves as a gate keeper between a public computer network and the private computer network. Examples of content filtering services that may be performed at the gateway computer include antivirus, antispam, URL (uniform resource locator) filtering, etc. Traditionally, the gateway computer is deemed the best place to perform all content filtering services because it provides a central location and is generally easy to maintain from the point of view of a network administrator. However, content filtering at a gateway computer is not without its share of drawbacks. Content filtering at the gateway computer is CPU (central processing unit) intensive, taking substantial CPU time from other gateway tasks. The size of patterns used by content filtering systems also grows at a fast rate, making content filtering at the gateway computer difficult if not unsustainable in the future. Furthermore, policy enforcement done at the gateway computer requires additional information (e.g., databases) to be maintained at the gateway computer.

SUMMARY

In one embodiment, a gateway computer is configured to be in the data path of network communications between client computers in a private computer network and computers in a public computer network. A master entity in the gateway computer may be configured to determine content filtering services available in the client computers. The master entity may delegate to the client computers performance of content filtering services that may be reliably performed in the client computers. Each of the client computers may include a trusted agent in communication with the master entity to coordinate content filtering in the private computer network.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
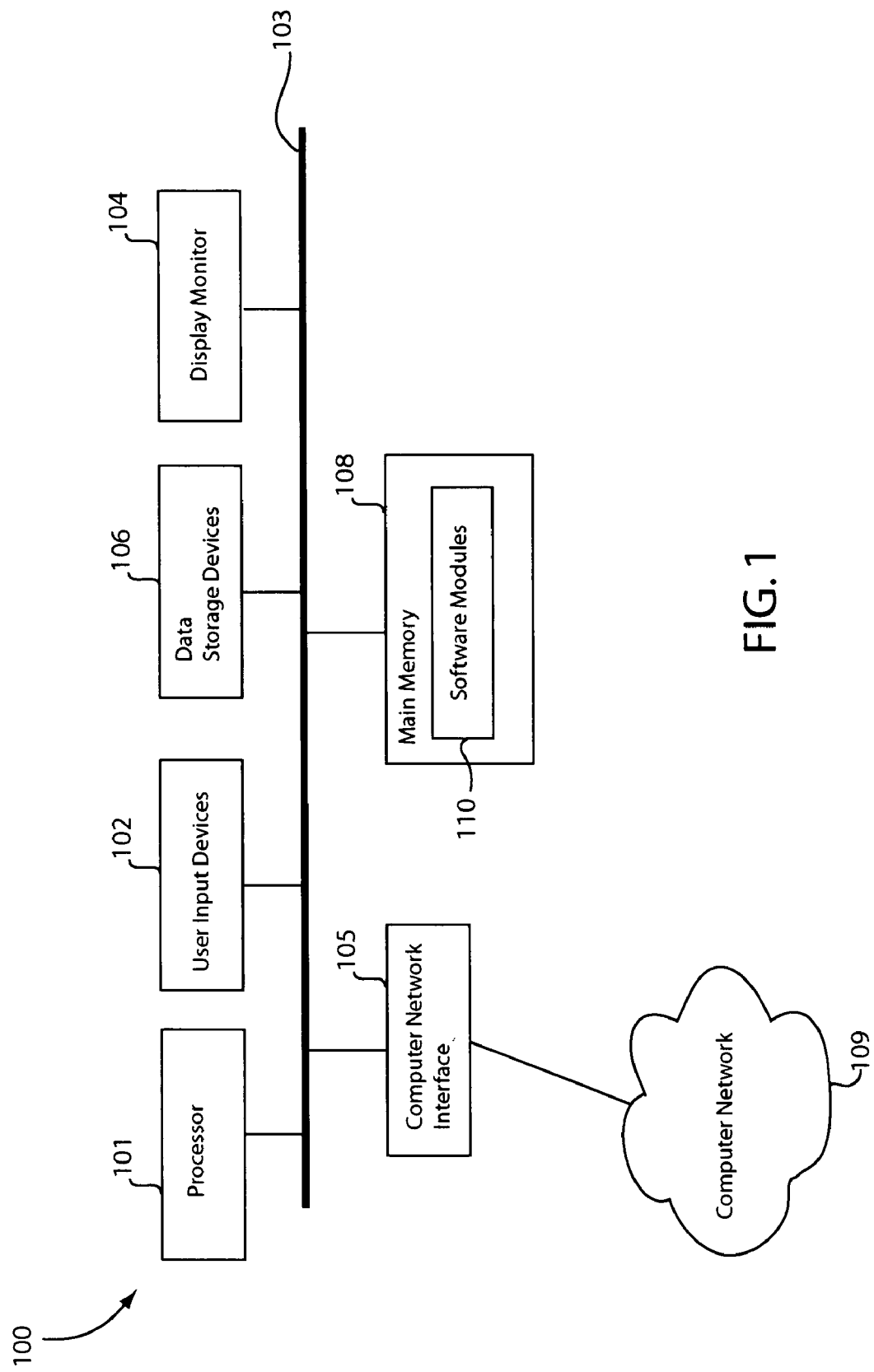
FIG. 1 shows a schematic diagram of a computer in accordance with an embodiment of the present invention.

FIG. 1 shows a schematic diagram of a computer 100 in accordance with an embodiment of the present invention. Depending on its particular configuration, the computer 100 may be employed as a client computer 230 or a gateway computer 221 (see FIG. 2). The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes software modules 110, which may be software components of a client computer 230 or gateway computer 221. The software modules 110 may be loaded from the data storage device 106 to the main memory 108 for execution by the processor 101. The computer network interface 105 may be coupled to a computer network 109.

Figure 2:
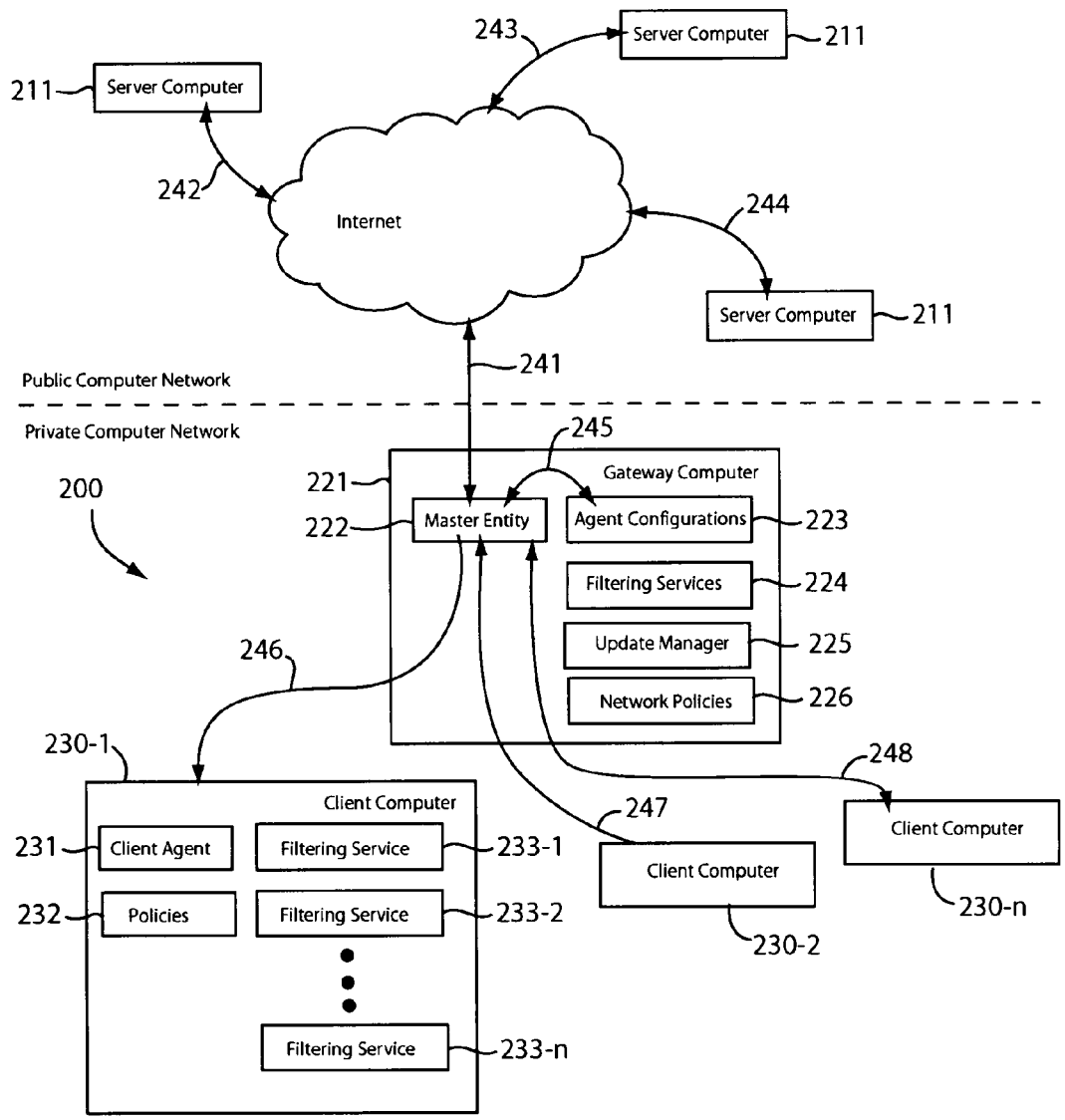
FIG. 2 schematically shows a content filtering system in accordance with an embodiment of the present invention.

FIG. 2 schematically shows a content filtering system 200 in accordance with an embodiment of the present invention. In the example of FIG. 2, the content filtering system 200 comprises a gateway computer 221 and a plurality of client computers 230 (i.e., 230-1, 230-2, . . . 230-n). The content filtering system 200 may be configured to provide content filtering services in a private computer network. The content filtering system 200 protects the private computer network from computer security threats arising from network communications between the private computer network and a public computer network, which includes the Internet in this example.

In one embodiment, the gateway computer 221 is configured to be in the data path of network communications between the client computers 230 and computers in the public computer network, which includes the server computers 211. For example, the gateway computer 221 may serve as a proxy server. This allows the gateway computer 221 to serve as a gate keeper, monitoring network communications between the private and public computer networks for content filtering.

The gateway computer 211 may comprise a master entity 222, agent configurations 223, content filtering services 224, update manager 225, and network policies 226. The master entity 222 may comprise computer-readable program code for coordinating content filtering between the gateway computer 221 and the client computers 230. In one embodiment, the master entity 222 is configured to determine which content filtering services are available and can be reliably performed in a client computer 230, and delegate those content filtering services to the client computer 230 instead of performing them in the gateway computer 221.

The master entity 222 may maintain a record of agent configurations 223. The agent configurations 223 may include information on content filtering services available in client computers 230, availability status of the client computers 230 to perform their respective content filtering services, trust level (e.g., version number and vendor of content filtering service) and other information. The master entity 222 may communicate with a client agent 231 in a client computer 230 to coordinate content filtering and to determine the agent configuration of the client computer 230. Communications between the master entity 222 and a client agent 231 may be encrypted or performed over a secure connection.

The content filtering services 224 may comprise different types of conventional content filtering services, such as antispam, antivirus, URL filtering, content-level compliance, and so on. Preferably, the gateway computer 221 includes a reasonably full suite of content filtering services 224. This allows the gateway computer 221 to perform content filtering services not available in a client computer 230. Content filtering services, in general, are well-known and provided by various computer security vendors including, Trend Micro, Inc.

The update manager 225 may comprise computer-readable program code for determining whether or not the client computers 230 have the latest filtering services 233 and other client-side components. In one embodiment, the update manager 225 works in conjunction with a client agent 231 to check component version numbers in the corresponding client computer 230 and, if available, to provide the latest version as needed. The update manager 225 may periodically poll the client computers 230 to ensure they have up-to-date components. The gateway computer 221 may further include network policies 226 governing data transfer to and from the private computer network 200. For example, the network policies 226 may dictate blocking of data from particular IP addresses, transmission of emails with certain information, and so on. The master entity 222 may be configured to enforce the network policies 226.

Each client computer 230 may include a client agent 231, content filtering services 233 (i.e., 233-1, 233-2, . . . , 233-n), and policies 232. The client agent 231 may comprise computer-readable program code for coordinating content filtering with the master entity 222. In one embodiment, the client agent 231 provides the configuration of the client computer 230, including information on locally available (i.e., in the client computer 230) content filtering services, availability status of the client computer 230 to perform content filtering, version and vendor information of locally available content filtering services, and so on.

Similar to the content filtering services 224, the content filtering services 233 (i.e., 233-1, 233-2, . . . , 233-n) may comprise different types of conventional content filtering services, such as antispam, antivirus, URL filtering, content-level compliance, and so on. A client computer 230 may not have all of the content filtering services available in the gateway computer 221. Different client computers 230 may also have different content filtering services; some having more content filtering services than others, for example. In one embodiment, the master entity 222 delegates content filtering to a client computer 230 to the extent that the client computer 230 can reliably perform the content filtering (e.g., having an up to date content filtering service from a reputable vendor) and is available to do so (e.g., is on-line).

The client agent 231 may be configured to locally enforce the policies 232. The policies 232 may be set by the network administrator or user and may include policies governing use of the client computer 230, data that may not be received into or transmitted from the client computer 230, and so on. The policies 232 may be dependent on results of locally performed content filtering services. For example, the policies 232 may dictate quarantine or removal of data infected by malicious code as determined by a content filtering service 233-1 (e.g., antivirus), blocking of web pages from a prohibited URL as determined by a content filtering service 233-2 (e.g., URL filter), blocking of spam emails detected by a content filtering service 233-3 (e.g., antispam), etc.

In the example operation of FIG. 2, the gateway computer 221 receives all network communications (arrow 241) between client computers 230 and computers in the public computer network (arrows 242-244). For network packets intended for a particular client computer 230, such as the client computer 230-1, the master entity 222 checks the agent configurations 223 to determine which content filtering services, if any, may be performed in the client computer 230-1 (arrow 245). The master entity 222 performs content filtering on the packets using content filtering services not available or cannot be reliably performed in the client computer 230-1.

The master entity 222 may also be configured to scan packets based on traffic flow. More particularly, the master entity 222 may decide to scan the packets even if the client computer 230-1 is fully equipped to do so if deemed advantageous or necessary for that particular type of traffic, such as for HTTP and SMTP traffic. The master entity 222 may also decide to scan packets based on threat level. For example, the master entity 222 may be configured to scan traffic for blocking if the threat level is high for that particular type of traffic, regardless of whether or not the client computer 230-1 is capable of scanning the traffic. The master entity may receive threat levels from an external server computer (not shown) operated by a network security vendor.

In the example of FIG. 2, the master entity 222 does not perform content filtering services that may be delegated to the client computer 230-1. The master entity 222 thereafter forwards the packets to the client computer 230-1 (arrow 246), where the client computer 230-1 performs content filtering on the data packet using content filtering services not performed in the gateway computer 221. As can be appreciated, content filtering may be performed in both directions between the gateway computer 221 and a client computer 230 (arrow 248).

As another example, a client computer 230-2 may be sending an email (arrow 247) that may or may not be containing prohibited text (e.g., trade secret information or profanity) to a server computer 211. The master entity 222 may receive the email and, by consulting the agent configurations 223 (arrow 245), is informed that the client computer 230-2 does not have an email text filtering service. In that case, the master entity 222 may scan the email using an email text filtering service. Otherwise, if the master entity 222 is informed by consulting the agent configurations 223 that the client computer 230-2 has an email text filtering service, the master entity 222 may choose to pass the email through if the client computer 230-2 can be expected to reliably (i.e., can be trusted) perform email text filtering on the email.

Yet another example, the client computer 230-1 may be accessing a resource on the Internet, such as a web page from a server computer 211 (arrow 242). The master entity 222 receives the web page in the gateway computer 221 (arrow 241) and consults the agent configurations 223 to determine if the client computer 230-1 has a URL filtering or web reputation service (arrow 245). If so, the master entity 222 may allow the web page to pass through (arrow 246) and be received by the client computer 230-1 without performing URL filtering—delegating the URL filtering to the client computer 230-1. Otherwise, if the client computer 230-1 does not have a URL filtering service, the master entity may check the URL of the web page using a URL filtering service in the gateway computer 221 to determine whether or not to block the web page from being received in the client computer 230-1.

Figure 3:
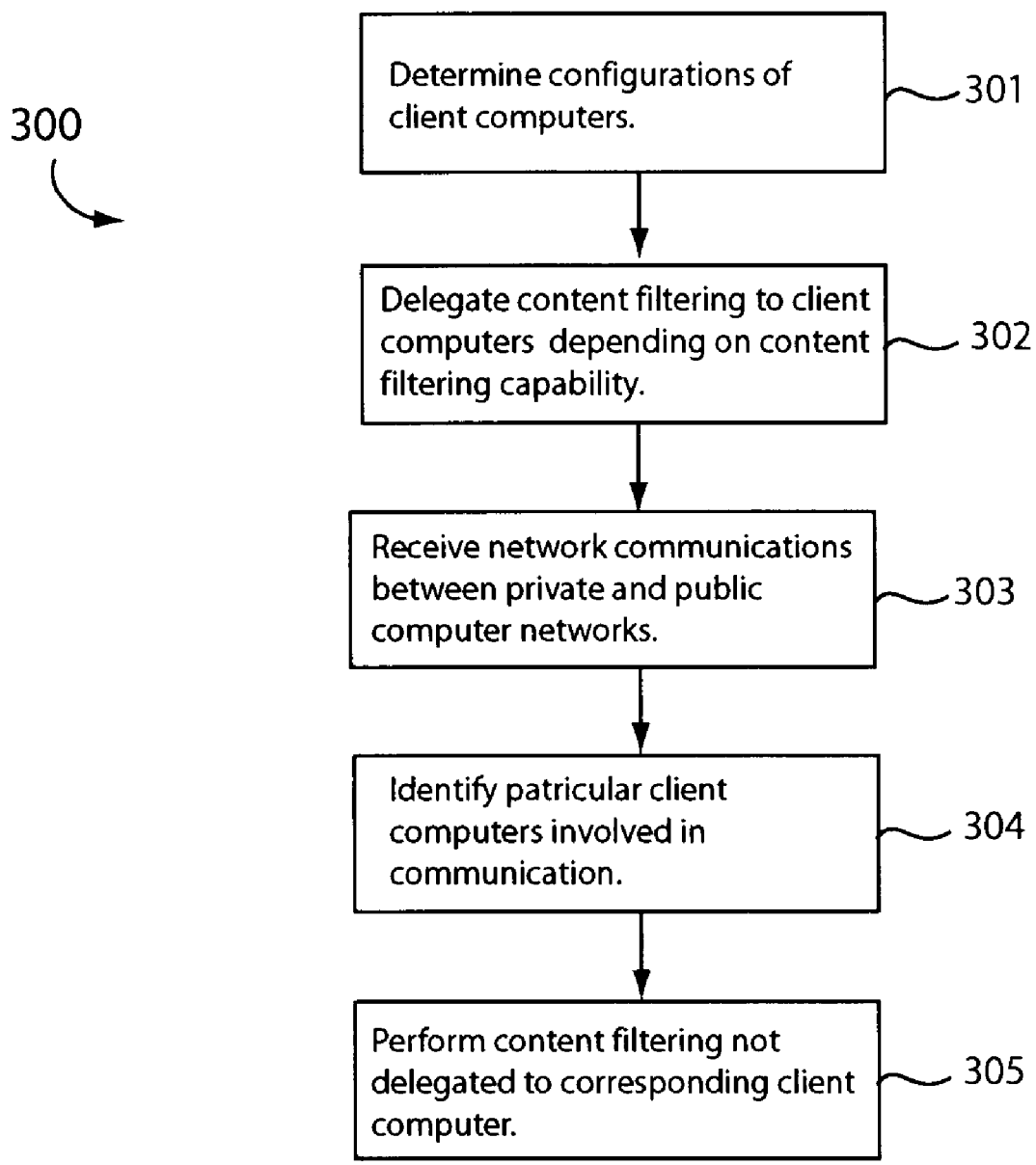
FIG. 3 shows a flow diagram of a method of performing content filtering services in a computer network in accordance with an embodiment of the present invention.

FIG. 3 shows a flow diagram of a method 300 of performing content filtering services in a computer network in accordance with an embodiment of the present invention. The method 300 is explained using the components shown in FIG. 2 for illustration purposes only. The method 300 may also be performed by other components without detracting from the merits of the present invention.

The method 300 begins with the master entity 222 determining the content filtering configurations in the client computers 230 (step 301). The master entity 222 may enter the content filtering configurations in the agent configurations 223. The content filtering configurations may include information on content filtering services available in client computers 230, availability status of the client computers 230 to perform their respective content filtering services, trust level and other information. The master entity 222 may receive the content filtering configurations from client agents 231 during a registration process, for example.

The master entity 222 may delegate content filtering to client agents 231 depending on their content filtering capability (step 302). The master entity 222 may delegate to client agents 231 content filtering services available in their client computers 230. That is, the master entity 222 may be configured to perform content filtering services that are not available in client computers 230 and delegate those that may be reliably performed in client computers 230. To determine the reliability of a client computer 230 to perform a content filtering service, the master entity 222 may take into account not just the presence of that content filtering service in the client computer 230, but also whether or not the content filtering service is current (i.e., has the latest version) and from a reputable network security vendor.

The master entity 222 may receive network communications between the client computers 230 and computers in the public computer network (step 303). The master entity 222 may identify the client computers 230 involved in particular network communications (step 304). For example, the master entity 222 may inspect packets for addresses to extract destination or source addresses. The master entity 222 may initiate in the gateway computer 221 content filtering services not delegated to a client computer 230 (step 305). for example, the master entity 222 may delegate content filtering services to the client computer 230 and perform other content filtering services available in the gateway computer 221.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of performing content filtering services in a computer network, the method to be performed in a gateway computer and comprising:

determining content filtering services available in a plurality of client computers in the computer network;

delegating to one or more client computers in the plurality of client computers content filtering services available in the one or more client computers;

receiving in the gateway computer communications between computers in a public computer network and the plurality of client computers;

identifying a first client computer in the plurality of client computers involved in a first network communication between the first client computer and an external server computer outside the computer network;

performing a first content filtering service on a first data set on the first network communication, the first data set being from the external server computer and intended for the first client computer, the first content filtering service not available in the first client computer;

forwarding the first data set to the first client computer after performing the first content filtering service on the first data set in the gateway computer;

delegating performance of a second content filtering service on a second data set on the first network communication to the first client computer so that the second content filtering service on the second data set is performed in the first client computer and not in the gateway computer, the first content filtering service being different from the second content filtering service; and forwarding the second data set to the first client computer.

2. The method of claim 1 wherein the first content filtering service comprises antispam and the second content filtering service comprises antivirus.

3. The method of claim 1 further comprising:
maintaining a record of content filtering services available in the plurality of client computers; and
consulting the record to determine whether or not to delegate performance of a content filtering service to a client computer in the plurality of client computers.

4. The method of claim 1 further comprising:
identifying a second client computer in the plurality of client computers involved in a second network communication;
performing a third content filtering service on the second network communication, the third content filtering service not available in the second client computer; and
delegating performance of a fourth content filtering service on the second network communication to the second client computer.

5. The method of claim 4 wherein the first, second, third, and fourth content filtering services are different types of content filtering services.

6. The method of claim 1 wherein the first network communication transmits a web page from the external server computer to the first client computer and wherein the first content filtering service comprises URL filtering.

7. The method of claim 1 wherein the first network communication transmits an email to the first client computer and wherein the first content filtering service comprises email text filtering.

8. A computer implemented method of performing content filtering services in a computer network, the method comprising:

receiving a first set of data being transferred between a first client computer in a private computer network and a first server computer in a public computer network in a network communication between the first client computer and the first server computer;

determining a first content filtering service that the first client computer is able to perform on the first set of data;

delegating performance of the first content filtering service on the first set of data to the first client computer;

receiving a second set of data being transferred between a second client computer in the private computer network and a second server computer in the public computer network in a network communication between the second client computer and the second server computer;

determining a second content filtering service that the second client computer is able to perform on the second set of data, the second content filtering being different from the first content filtering service;

delegating performance of the second content filtering service on the second set of data to the second client computer; and performing the first content filtering service on the second set of data in a gateway computer located in a data path between the first and second client computers and the first and second server computers.

9. The method of claim 8 wherein the first content filtering service comprises antispam and the second content filtering service comprises antivirus.

10. The method of claim 8 further comprising:

maintaining in the gateway computer a record of content filtering services available in the first and second client computers; and consulting the record to determine whether or not to delegate performance of the first content filtering service to the first client computer and of the second content filtering service to the second client computer.

11. The method of claim 8 wherein the first set of data comprise a web page transmitted by the first server computer to the first client computer and wherein the first content filtering service comprises URL filtering.

12. The method of claim 8 wherein the first set of data comprises an email transmitted from the first client computer to the second server computer and wherein the first content filtering service comprises email text filtering.

* * * * *